United States Patent [19]

Burton

[11] 4,363,537

[45] Dec. 14, 1982

[54] ADJUSTABLE SPECTACLES

[76] Inventor: Andrew F. Burton, 6727 - 16th St. NW., Washington, D.C. 20012

[21] Appl. No.: 41,257

[22] Filed: May 21, 1979

[51] Int. Cl.³ .......................... G02C 7/06; G02C 7/08; G02C 1/08
[52] U.S. Cl. ........................................ 351/90; 351/55; 351/57; 351/58
[58] Field of Search ...................... 351/47, 48, 55, 57, 351/58, 59, 90, 107, 148, 54

[56] References Cited

U.S. PATENT DOCUMENTS

| | | | |
|---|---|---|---|
| 1,102,909 | 7/1914 | Hanna | 351/55 |
| 2,057,287 | 10/1936 | Bailey | 351/55 |
| 2,842,029 | 7/1958 | Roth | 351/55 |
| 2,921,500 | 1/1960 | Gell | 351/90 |
| 3,365,263 | 1/1968 | Allen | 351/55 |
| 3,446,548 | 5/1969 | Rummel et al. | 351/55 |
| 3,698,801 | 10/1972 | Masucci | 351/55 |

FOREIGN PATENT DOCUMENTS 1200570 9/1965 Fed. Rep. of Germany ........ 351/55

*Primary Examiner*—John K. Corbin
*Assistant Examiner*—Rodney Bovernick
*Attorney, Agent, or Firm*—Cushman, Darby & Cushman

[57] ABSTRACT

Adjustable bifocal spectacles having at least one pair of lenses mounted in an upper frame vertically movable in relation to a lower frame so that the focal length may be changed by raising and lowering a pair of lenses in the sight line of the viewer. Means are provided for applying a pressure to the upper and lower frames either at opposite ends of the frames or at the nose support and bridge to raise or lower the upper frame in relation to the lower frame, the pressure being symmetrical with respect to the nose and bridge. Vertical movement of the lenses is accomplished by actuating a mechanism at one side or at opposite sides of the lens frame, either mounted directly to the lens frame or mounted in modified temples so that the spectacles may be adjusted without placing the hand in front of the face.

9 Claims, 13 Drawing Figures

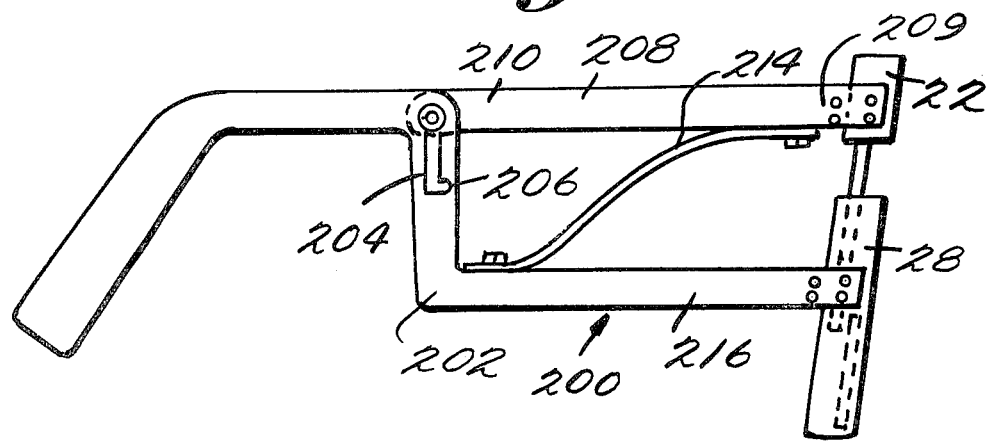
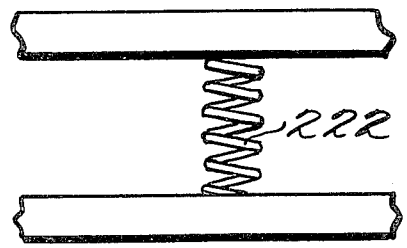
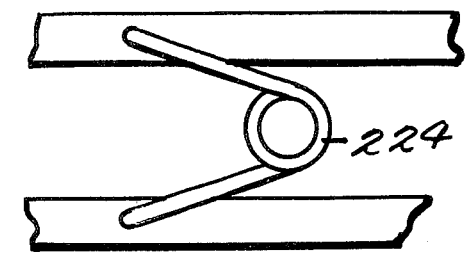
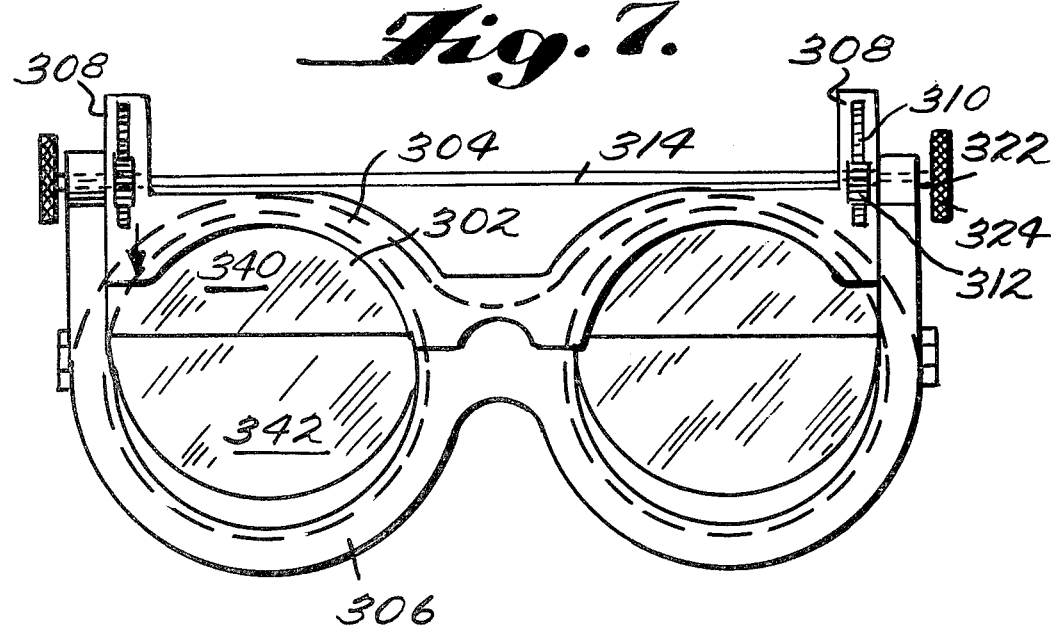

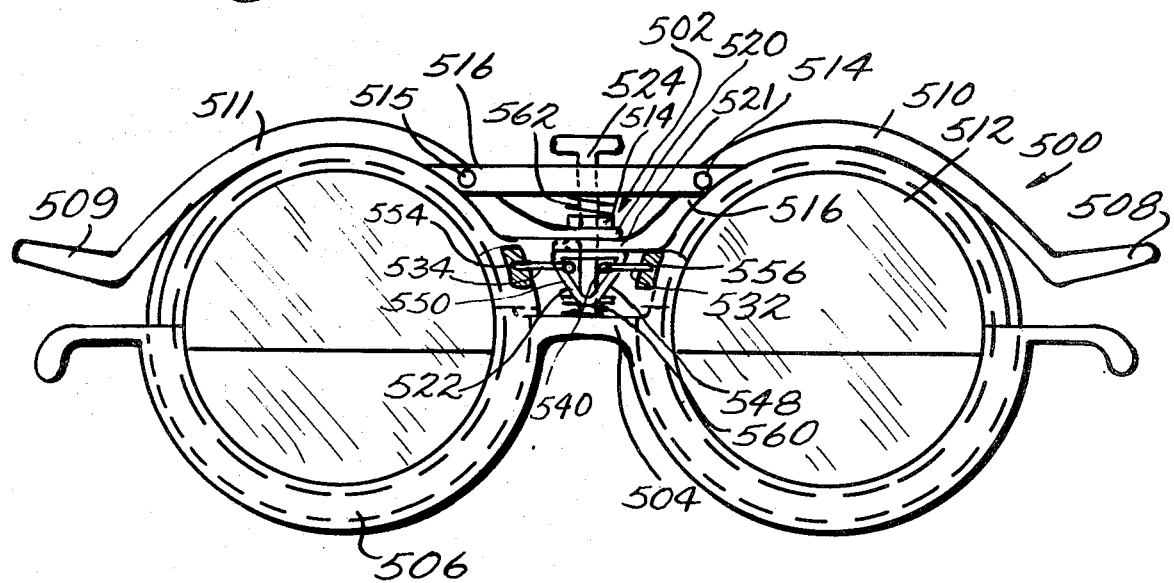
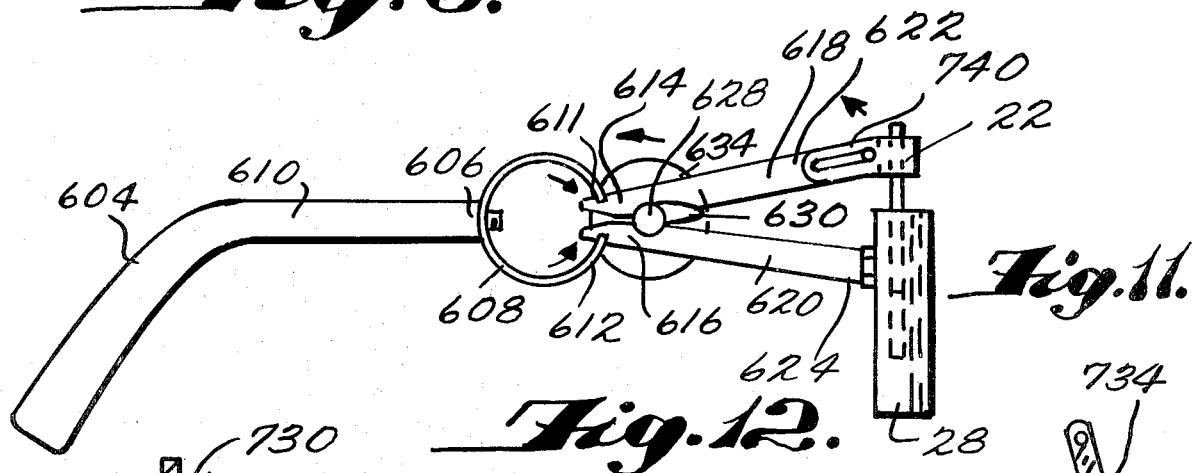
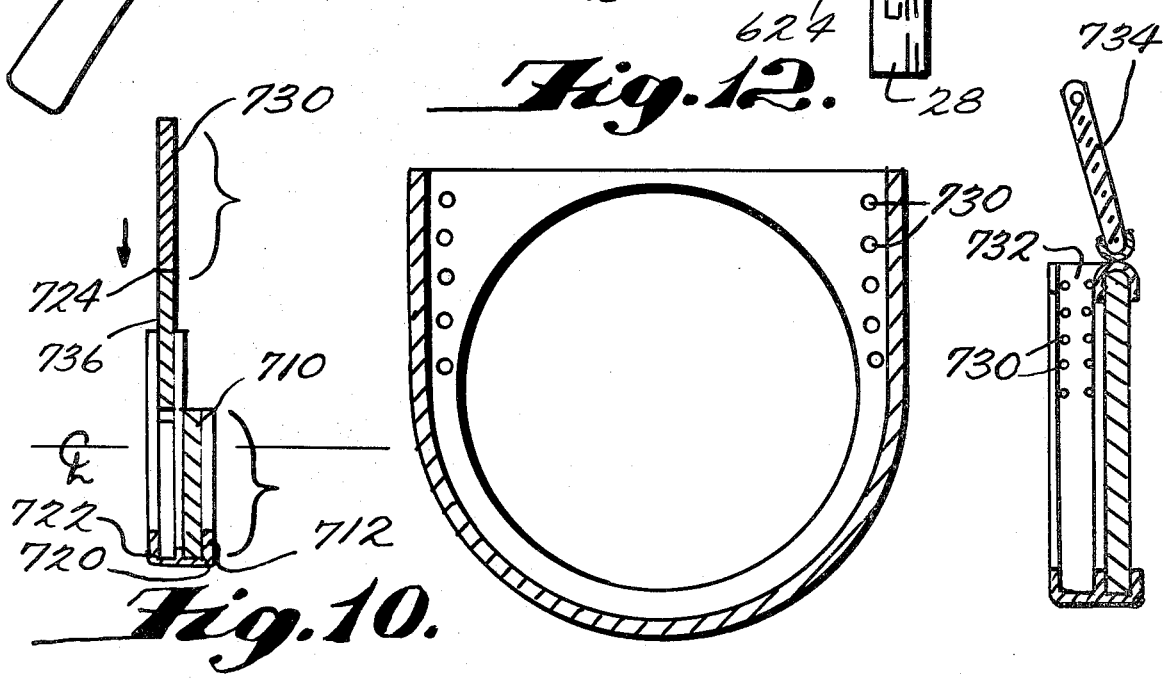

ADJUSTABLE SPECTACLES

BACKGROUND OF THE INVENTION

1. Field of the Invention

The present invention relates to spectacles or eyeglasses having a pair of lenses, vertically movable in unison in front of the wearer's eyes in order to facilitate a change in the focal length or lens color in the sight line of the wearer. More particularly, the invention pertains to eyeglasses which allow the wearer to manually change focal length without the necessity of obstructing his vision or moving the body or eye from the object.

2. Description of the Prior Art

Conventional spectacles which may be used for both close-in and far distance viewing include bifocal lenses having a lower portion for close-in viewing and an upper portion for far distance viewing and often require for close-in viewing an adjustment in the position of the spectacles on the nose or a raising of the head often with an attendant eye movement. Viewing close-in objects at levels above the eyes often requires hyperextension of the cervical spine which can be tiring and contribute to spinal deformation, particularly among the aged. Adjustment of glasses on the nose as an alternative to hyperextension can be painful, embarrassing and cause injury to the nose.

An alternative to the conventional spectacles having unifocal or bifocal lenses fixed in a unitary frame is the provision of spectacles having a pair of lenses, wherein each lens is aligned to an eye of the wearer and vertically movable in unison with respect to a fixed lower frame so that changes in focal length can be made without changing the sight line of each eye of the wearer. A second alternative similar to the first provides a second pair of lenses fixed in relation to the main frame. In the latter alternative, trifocal vision becomes practical if one pair of lenses are bifocal.

Roth, U.S. Pat. No. 2,842,029, shows a vertically adjustable pair of lenses attachable to a pair of spectacles at the nose bridge of the spectacles. Similarly, Masucci, U.S. Pat. Nos. 3,698,801 and 3,425,773, and Bell, U.S. Pat. No. 2,921,550 all illustrate a spectacle frame supporting a single pair of lenses that are vertically adjustable with respect to the frame. Each of these spectacles provides for adjusting the lens position with the hand at or near the nose bridge of the spectacles. Such spectacles have inter alia the obvious disadvantage that the wearer's vision is blocked when such an adjustmant is made. This can make the adjustment more difficult and interfere with activities of the wearer which require his undivided attention. For example, a surgeon requiring bifocal lenses during surgery would be distracted by having to put his hand in front of his face in order to alter the focal length of the glasses. Also, adjusting a pair of adjustable spectacles by placing the hand at the spectacle bridge is annoying to the wearer in some circumstances.

SUMMARY OF THE INVENTION

The spectacles of the present invention overcome the disadvantages of conventional spectacles and prior adjustable spectacles by allowing the wearer to change focal length without obstructing vision or the movement of the neck or eyes from the line of sight. In accordance with the present invention, spectacles having a pair of lenses such as bifocal lenses, dual-shaded lenses or half height near-vision lenses, which may be raised or lowered in unison in the sightline of the eyes of the wearer, are provided with means for actuating such raising or lowering at or near the one or both of the temples of the wearer. In one embodiment of the invention, the raising or lowering of the bifocal lenses is accomplished by springs mounted in a modified U-shaped ear bar which can be actuated by depressing the ear bar at or near the temples of the wearer to thereby slide the bifocal lens up or down. In a further embodiment of the invention, rack and pinion mechanisms mounted to the frame near the ear bar hinges are utilized to raise and lower a slidable lens frame. In further embodiments of the invention the lenses are urged upward by a spring mechanism mounted adjacent to the spectacle bridge but are actuated by a latch mechanism mounted on the frame adjacent to one or both of the wearer's temples. In a trifocal embodiment of the invention, two pairs of lenses are provided, one pair being bifocal and vertically slidable in relation to the other, to provide for trifocal vision.

The spectacles of the present invention thus permit the shifting of the lenses in the bifocal lens into the sightline of the wearer by actuating a mechanism on or adjacent to the ear bars without requiring the bending or arching of the wearer's neck to change focal distances for close-in and far away objects. In addition, the invention allows the focal length of the spectacles to be changed without the hand of the wearer impeding the wearer's vision. Also, the particular utilization of springs, catches and other mechanisms provide a simple, convenient, and effective way to temporarily hold one or the other of the bifocal lenses in the sightline of the wearer.

DESCRIPTION OF THE DRAWINGS

Other features and advantages of the invention will be apparent from the following description when taken in conjunction with the illustrative embodiments in the accompanying drawings in which:

FIG. 4 is a side elevation of a third embodiment of the present invention;

FIGS. 5a and 5b illustrate alternate embodiments of the spring portion of the embodiment illustrated in FIG. 4;

FIG. 6 is a side elevation of a fourth embodiment of the present invention;

FIG. 7 is a front elevation of a fifth embodiment of the present invention;

FIG. 9 is a front elevation of a seventh embodiment of the present invention;

FIG. 10 is a side sectional elevation of an alternate embodiment of the lenses of the embodiments illustrated in FIGS. 1-9;

FIG. 11 is a side sectional elevation of another alternate embodiment of the lenses of the present invention; and FIG. 12 illustrates a sectional front elevation of the lower frame portion of the lens embodiment illustrated in FIG. 11.

DETAILED DESCRIPTION OF THE INVENTION

Figure 1:
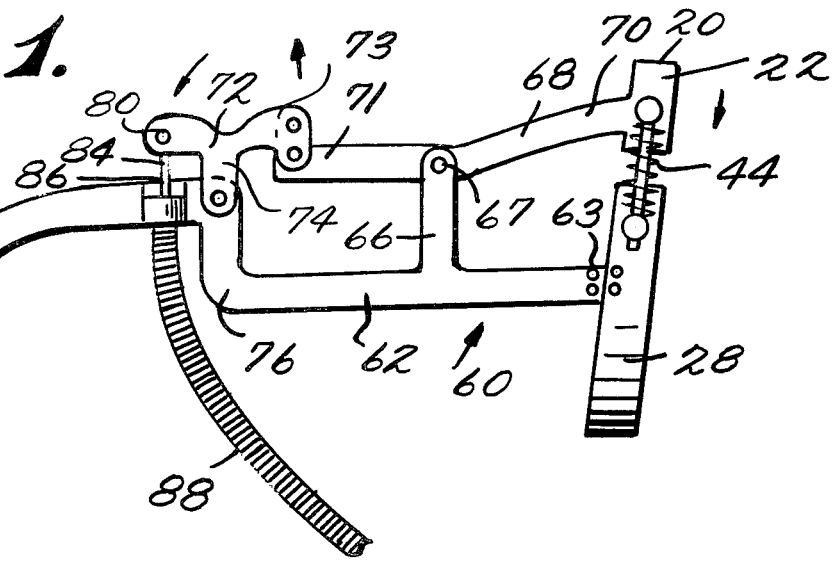
FIG. 1 is a side elevation of an embodiment of the present invention.
Figure 2:
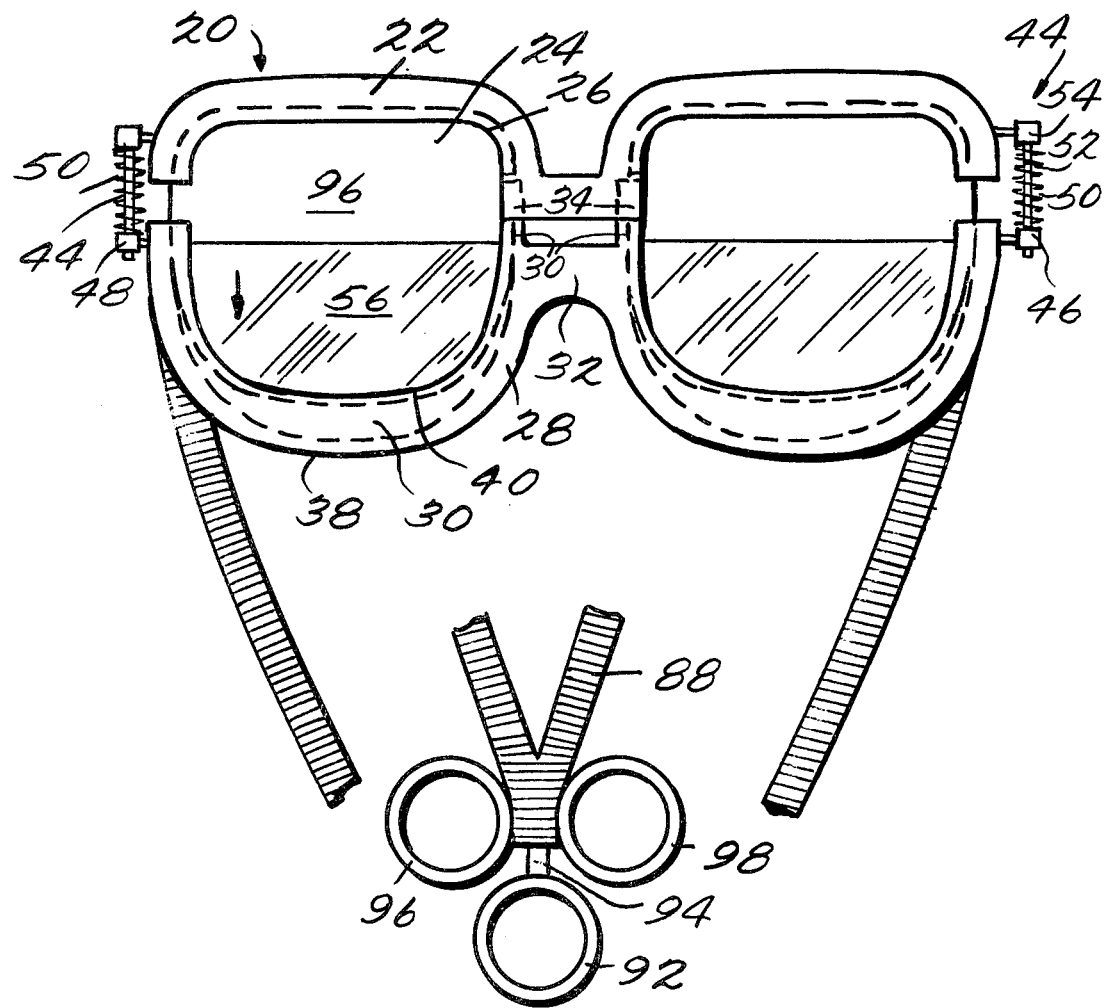
FIG. 2 is a front elevation of the embodiment illustrated in FIG. 1.

Referring now to FIGS. 1 and 2, a side and front elevation of a pair of glasses constructed in accordance with the invention. FIGS. 1 and 2 illustrate spectacle frame 20 having an upper frame 22 vertically supporting a pair of lenses, suitably bifocal lenses 24, along their top and upper side edges 26, and a lower frame 28 having two upward extending legs 30 at bridge portion 32 for slidably engaging upper frame 22 in guide openings 34. Grooves 36 in lower frame 28 from rims 38 for slidably receiving the bottom edge 40 of lens 24. Guide pins 44 having shafts 52 and heads 54 attached at opposite ends of upper frame 22 slidably engage guide sleeves 46 mounted at opposite ends of lower frame 28. Expansion springs 50 are optionally mounted on guide pin shafts 52 between guide pin heads 54 and guide sleeves 46 to urge upper and lower frames 22 and 28 apart raising bifocal lens near vision portions 56 upward into the line of sight of the wearer.

A mechanism for urging the upper frame 22 and lenses 24 in a downward direction are provided by a modified temple bar 60 best shown in FIG. 1. Temple bar 60 includes a fixed ear bar 62 having one end 63 hingedly attached to lower frame 28 and a second end portion 64 adapted for resting on the wearer's ear. Ear bar 62 also has a vertical leg portion 66 extending upward to the middle of a substantially horizontal member 68 one end of which 70 is hingedly connected to one end of upper frame 22 and the other end of which 71 is connected to a crank arm 72. Each crank arm 72 suitably has a front curved arm portion 73 pivotally connected to end 71 of member 68, a center vertical leg 74 hingedly connected to a central portion 76 of lower ear bar 62 and a substantially horizontal arm 80 extending away from curved arm 73. Each arm 80 is connected to a top end 84 of a Y-shaped cable 86. Cable 86 is surrounded by a Y-shaped sheath 88 the top ends of which 90 are fixed to an ear bar 62 directly below arm 80. A suitable handle such as ring 92 is mounted to the bottom end 94 of cable 86. By pulling down on ring 92 relative to sheath 88, crank arm 72 is actuated to rotate arm 68 about pivot point 67 on vertical member 66 causing upper frame 22 to move in a downward direction so that lens upper portions 96 are brought into the line of sight of the wearer.

Two finger support rings 98 are fixed to sheath 88 adjacent to ring 92 for ease in pulling cable 86 relative to sheath 88. Friction between cable 86 and sheath 88 is sufficient to hold upper frame 22 in the lower position against the urging of spring 50 until moved upward by pushing upward on ring 92 to urge crank 72 in the opposite direction.

Figure 3:
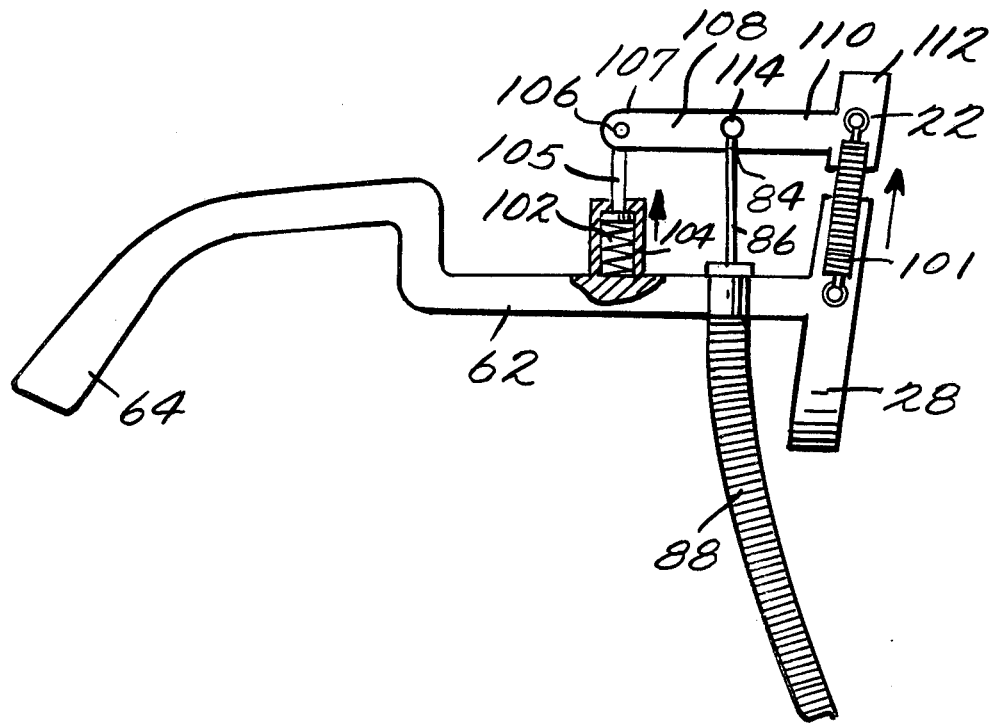
FIG. 3 is a side elevation of a second embodiment of the present invention.

Referring now to FIG. 3, a further embodiment of the slide means shown in FIGS. 1 and 2 is illustrated. Similar elements as those shown in FIGS. 1 and 2 are identified with the same numerals. In accordance with the second embodiment of the invention, an expansion spring 101 is mounted on pin 44 urging upper frame 22 toward a raised position. An expansion spring 102 mounted in a guide shaft 104 vertically disposed on lower ear bar 62 urges vertical piston rod 105 axially in an upward direction. The upper end 106 of vertical piston rod 105 is connected to one end 107 of upper ear bar 108, the other end 110 of bar 108 being hingedly connected to one of the opposite ends 112 of upper frame 22. A Y-shaped cable and sheath identical to those shown in FIG. 2 is utilized for raising and lowering upper frame 22. End 84 of cable 86 is connected at the approximate midpoint 114 of upper ear bar 108 and the upper end 90 of sheath 88 is fixed to lower ear bar 62 vertically below connection point 114. By pulling downard on cable 86 at ring 92 relative to sheath 88 upper frame 22 may be pulled to its lower position. Again, friction between the cable 86 and the sheath 88 is sufficient to keep the upper frame 22 in its lower position.

FIG. 4 illustrates a configuration of modified temples 200 which includes means for raising and lowering the upper frame 22 relative to lower frame 28. The same numerals as used previously identify the same elements. In this embodiment, there is included a lower ear bar 202 having a vertical slot 204 with an indentation 206 at the bottom thereof. An upper ear bar 208 hingedly mounted at one end 209 to upper frame 22 is vertically slidably mounted at its other end 210 in slot 204. A spring, suitably bow spring 214, is disposed between upper ear bar 208 and horizontal portion 216 of lower ear bar 202. Spring 214 is suitably an expansion spring which urges upper ear bar 208 and upper frame 22 to the upper portion shown in FIG. 4. A coil spring 222 or a V-shaped spring 224 respectively shown in FIGS. 5a and 5b may suitably replace spring 214. By placing the hands to one or both temples 200, and lightly squeezing upper ear bar 208 and lower ear bar 202 together to lower ear bar horizontal portion 218, upper ear bar 208 and upper frame 22 may be moved downward until upper ear bar end 210 is latched in slot indentation 206 and lenses 24 are positioned so that lens upper portion 96 is in the wearer's line of sight. By a suitable light squeeze to the ear bars 202 and 208 upper ear bar end 210 may be released from indentation 206 so that spring 214 urges upper ear bar 208 and upper frame 202 to its upper position.

Another embodiment of the adjustable spectacles of the present invention which is actuable in a modified temple is shown in FIG. 6. In accordance with this embodiment, an ear piece 610 has one end 612 adapted to rest on the ear and another end 606 connected to a clip spring 608, the tip ends 611 and 612 of which are respectively fixed to ends 614 and 616 of upper top arm bar 618 and lower arm bar 620, respectively. The respective opposite ends 622 and 624 of arm bars 618 and 620 are respectively hingedly connected to opposite ends of upper frame 22 and lower frame 28 as has been described with respect to the embodiments described above. Means for separating bars 618 and 620, suitably a short cylinder 628 with a cam surface 630 disposed between arm bars 618 and 620 adjacent to clip spring tips 611 and 612 so that when rotated by wheel 634 cause ear bars 618 and 620 to separate, are provided so that upper frame 22 may be raised relative to lower frame 28.

Figure 8:
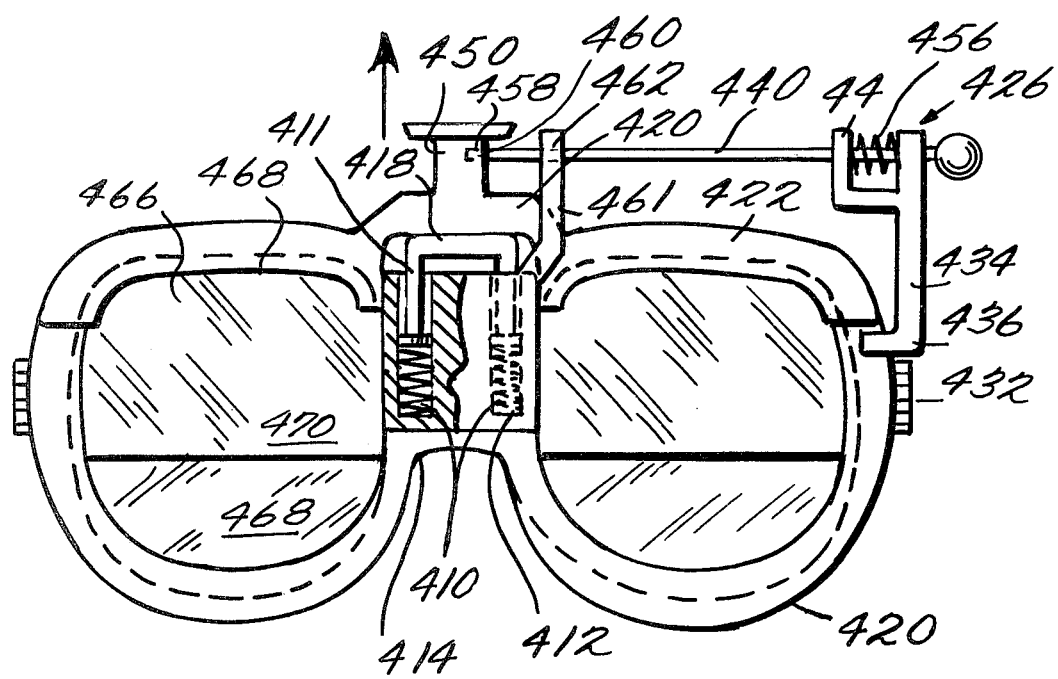
FIG. 8 is a front elevation with a portion cut away of a sixth embodiment of the present invention.

In other embodiments of the invention such as are illustrated in FIGS. 7, 8 and 9, means for raising and lowering upper frame 22 are mounted directly on the frame rather than in a modified temple. In these embodiments, a conventional temple may be hingedly mounted to the lower frame 28 as illustrated in FIG. 7. In accordance with the fourth embodiment of the invention as illustrated in FIG. 7, bifocal lenses 302 are mounted in upper frame 304 which move vertically in relation to lower frames 306. Upper frames 304 have hollowed out leg portions 308 disposed at opposite ends of upper frame 304. A rack 310 is mounted, and a cooperating pinion 312 disposed, in each leg portion 308. A rod 314 extends horizontally through aligned horizontal holes 316 through the top of extended leg portions 318 at opposite ends of lower frame 306 which vertically slidably engages leg portions 310 of upper frame 304, pinions 312 being axially mounted on opposite ends of rod 314 adjacent to holes 316. End portions 322 of rod 314 extend beyond bottom frame leg portions 318 and have attached thereto small wheels 324 suitable for turning rod 314. Rod 314 is suitably fixed to pinions 312 so the rotation of rod 312 will cause upper frame 302 to move up or down to bring either distal lens portion 340 or near lens portion 342 into the line of sight of the wearer. Since rod 314 is symmetrically connected to rack and pinion mechanisms at opposite ends of the upper frame, the mechanism may be actuated by turning either wheel 324.

Another embodiment of the invention which permits actuation of a means for raising an upper lens frame with respect to a lower lens frame by a mechanism disposed on the frame adjacent to the ear bar hinge is illustrated in FIG. 8. In accordance with the embodiment shown in FIG. 8, two expansion springs 410 vertically disposed in open guide shafts 412 above nose support 414 urge vertical legs 416 of U-shaped member 418 against bridge portion 420 of upper frame 422. A latch mechanism 426 connected to bottom frame 430 adjacent to ear bar hinge 432 releasably holds upper frame 422 in a lower position compressing springs 410 as will be described. Latch 426 includes a U-shaped frame 434 which is connected at its base 436 to lower frame 420 and slidably supports a horizontally disposed pin 440 through holes 444 in the top legs 446 of frame 434. Pin 440 extends horizontally to a vertical leg 450 which extends vertically from the top of bridge 420. A spring 456, disposed between legs 452 and 454 of frame 434 and through which pin 440 passes, biases the tip 460 of pin 440 against the leg 450. A support leg 461 which is connected to lower frame 420 above nose support 414, extends upward and receives pin 440 through a horizontal hole 462 therethrough to provide pin tip 460 with vertical support. A slot 458 is disposed in leg 450 to hold frame 422 in a downward position when the tip 460 of pin 440 is disposed therein. By pulling pin 440 out of slot 458, springs 412 are free to push bridge 420 and upper frame 422 to its upward position where the near distance portion 466 of lenses 468 are in the light of sight of each eye of the wearer. The distal portion 470 of lenses 468 may be caused to be lowered into the line of sight of each eye of the wearer by pressing downward on leg 450 until pin tip 460 falls in slot 458.

Another embodiment of the invention which utilizes a spring mechanism disposed near the nose support or bridge of the frame is shown in FIG. 9. In accordance with this embodiment, there is provided a spring biased mechanism 502 disposed above the nose support portion 504 of lower frame 506 which is actuable by squeezing down or raising tab ends 508 and 509 of curved actuation bars 510 and 511 disposed at opposite ends of frame 500. Actuation bars 510 are pivotally connected to upper frame 512 at opposite ends of upper frame bridge 516. To the inside of pivots 514 curved actuation bars 510 and 511 bend into ends 520 and 521 disposed in parallel confronting relation above triangular groove members 522. Member 522 slidably engages pin 524 which is vertically mounted to nose support 504 and extends upward successively slidably engaging triangular groove member 522, actuation bar ends 520 and 521 and bridge 516. Pins 532 and 534 slidably extend respectively through exterior walls 536 and 538 of triangular member 522 and sleeve 535 have sliding or roller members 540 engaging grooves 544 (not shown) along the interior surface of triangular legs 548 and 550. The other ends of pins 532 and 534 are disposable in notches 554 and 556 in upper extended portion 558 of lower frame 506 and lock upper frame 512 in its lower position as is shown in FIG. 9. Extension springs 560 and 562 are respectively disposed around pin 524 between nose support 504 and triangular member 522 and between arm member 521 and bridge 516. Extension spring 560 should be substantially stronger than spring 562. By squeezing tabs 508 and 509 bars 510 and 511 rotate about pivots 514 and 515 causing ends 520 and 521 to slide vertically on pin 524 thereby allowing triangular member 522 to be pushed slightly upward by spring 560. As triangular member 522 moves upward, pin rollers 540 roll along the interior surfaces of triangle legs 548 and 550 pulling pins 532 and 534 horizontally out of indentations 554 and 556 thereby releasing upper frame 512 to be forced upward by spring 560 exerted through bar ends 520 and 521 to pivots 514 and 515 and to bridge 516 through spring 562. By pushing down on bridge 516 upper frame 512 can be caused to move to its lower position.

Trifocal vision is made possible in another embodiment of the present invention. In accordance with this embodiment, as shown in FIG. 10, a fixed lower lens 710 is fixedly mounted in lower frame 712. Lower frame 712 may be substantially identical to lower frame 28 shown in FIGS. 1 and 2 except that it is deeper, having two grooves 720 for holding fixed lens 710 and groove 722 for slidably receiving the bottom edge of bifocal lens 724. In accordance with the invention, when bifocal lens 724 is in its lowest position bifocal lens lower portion 736 is disposed directly behind fixed lens 710 providing for close-in viewing and bifocal lens upper portion 730 is disposed directly in front of the viewer's line of sight for distal vision. When bifocal lens 724 is in its upper position lower lens portion 736 is disposed directly in the wearer's line of sight for intermediate distance viewing.

The lens arrangement shown in FIG. 10 may be adapted for use in any of the embodiments described above by simply providing for an additional fixed lens mounted in the lower frame.

A variation in the trifocal lens embodiment, shown in FIG. 11, is particularly adapted for adjustable spectacle wearers having foreheads which extend outward interfering with the vertical movement of the upper frame. In accordance with this embodiment, short monofocal lenses 734 are pivotally mounted to an upper ear bar such as by using latchable sleeves 740 illustrated in FIG. 6. As is illustrated in FIGS. 11 and 12, ball bearings 730 may suitably be placed along the sides of grooves 732 for ease of sliding of lenses 734 in and out of groove 732. In accordance with that embodiment, sleeve 740 comprises a slide member forming a sheath over end 622 of top ear bar 618 which may slide outward to extend upper ear bar 618 so that the lenses will clear the wearer's forehead. It will be clear to those skilled in the art that a pivotal means similar to that disclosed in FIG. 6 may also be adapted to the embodiments of the invention shown in FIGS. 1, 3 and 4.

Although particular embodiments of the present invention have been disclosed in detail above, for illustrative purposes, it will be understood that variations or modifications of the disclosure which lie within the scope of the appended claims are contemplated. For example, while each of the embodiments described above utilizes a pair of bifocal lenses, dual shaded lenses or short lenses which may be moved fully above or below the line of sight of the wearer are also contemplated as being within the scope of the invention.

What is claimed is:

1. Adjustable spectacles having a bridge portion, supportable on the nose of the wearer, comprising: an upper frame supporting a pair of bifocal lenses in horizontal alignment with the eyes of the wearer, each lens having an upper portion and a lower portion; a lower frame including said bridge portion, said bridge supporting said spectacles on the nose of the wearer; means for supporting said upper frame above said lower frame; means disposed at opposite ends of said lower frame for vertically moving said lenses in relation to said lower frame, said vertically moving means including means for sliding said bifocal lenses upward and downward between said two positions, said two positions including a downward position in which said upper portion is directly in front of the wearer's eyes and an upward position in which said lower position is directly in front of the wearer's eyes, said sliding means including an identical pair of rack and pinion disposed at said frame opposite ends and further comprising a rod connecting each said pinion and a handle connected to both ends of said rod so that by turning either one of said handles, both ends of said upper frame will move upward or downward in unison; actuation means disposed at at least one end of said lower frame for actuating said moving means.

2. Spectacles as in claim 1 further comprising two temples hingedly secured at opposite ends of said upper and lower frames and formed in the other end to engage the ears of the wearer, said two temples including said vertically moving means.

3. Spectacles as in claim 1 wherein said moving means further comprises Y-shaped sheath and elevation cable means including a Y-shaped elevation cable and Y-shaped sheath for raising and lowering said upper frame in relation to said lower frame by raising and lowering said cable in relation to said sheath.

4. Adjustable spectacles having a bridge portion, supportable on the nose of the wearer, comprising: an upper frame supporting a pair of bifocal lenses in horizontal alignment with the eyes of the wearer, each lens having an upper portion and a lower portion; a lower frame including said bridge portion, said bridge supporting said spectacles on the nose of the wearer; means for supporting said upper frame above said lower frame; means for vertically moving said lenses in relation to said lower frame, said vertically moving means including means for sliding said bifocal lenses upward and downward between said two positions, said two positions including a downward position in which said upper portion is directly in front of the wearer's eyes and an upward position in which said lower position is directly in front of the wearer's eyes; two temples hingedly located at opposite ends of said upper and lower frames and formed in the other end to engage the ears of the wearer, said two temples including said vertically moving means, each said temple one end including a top elongated member hingedly connected to said lower lens frame, each said temple including a spring connecting said upper and lower members, said springs jointly biasing said lenses into one of said two positions; actuation means disposed at at least one end of said lower frame for actuating said moving means.

5. Spectacles with adjustable bifocal lenses comprising: an upper frame supporting a pair of bifocal lenses; a lower frame including a nosepiece for supporting the spectacles on the bridge of a wearer's nose, each frame including a rearwardly extending member connected thereto at each side of the respective frame, the two members on each side of the spectacles having rear ends pivotally held together by a clip spring; a pair of temple bars for resting on the ears of the wearer; means connecting the upper frame to the lower frame, said connecting means providing for upward and downward movement of the upper frame relative to the lower frame; and means for positively raising and lowering the upper frame relative to the lower frame, said raising and lowering means including a manually operable control device carried by the spectacles at a location laterally outward with respect to the lenses such that the wearer's hand need not obstruct either lens when in contact with the control device, said manually operable control device being connected to said two members at a location adjacent the clip spring.

6. Spectacles with adjustable bifocal lenses comprising: an upper frame supporting a pair of bifocal lenses; a lower frame including a nosepiece for supporting the spectacles on the bridge of a wearer's nose; a pair of temple bars for resting on the ears of the wearer; means connecting the upper frame to the lower frame, said connecting means including a rack and pinion connected between said frames at a location on at least one side of the spectacles such that rotation of the pinion raises or lowers said upper frame relative to said lower frame; and means for positively raising and lowering the upper frame relative to the lower frame, said raising and lowering means including a manually operable thumb wheel connected to said pinion and carried by the spectacles at a location laterally outward with respect to the lenses such that the wearer's hand need not obstruct either lens when in contact with the thumb wheel.

7. Spectacles as in claim 6 wherein said lower frame includes an upwardly extending member at one side, said member having an aperture therethrough extending transverse to said temple bars, said thumb wheel being journalled in said aperture.

8. Adjustable trifocal spectacles comprising: an upper frame supporting a pair of bifocal lenses each having an upper-distance-vision portion and a lower intermediate-vision portion, a lower frame including a nosepiece for supporting said frames on the bridge of a wearer's nose, said lower frame carrying a further pair of lenses in offset relationship to said bifocal lenses, a pair of temple bars for resting on the ears of the wearer; means connecting said upper frame to said lower frame and providing for upward and downward movement of said upper frame between an upper position in which said intermediate-vision portions of said bifocal lenses are above said further lenses and a lower position in which said intermediate-vision portions of said bifocal lenses are aligned with said further lenses for close-in viewing.

9. Spectacles as in claim 8 wherein said raising and lowering means includes a manually operable control device carried by the spectacles at a location laterally outward with respect to said lenses such that the wearer's hand need not obstruct any of the lenses when in contact with the control device.

* * * * *